United States Patent [19]

Brown et al.

[11] Patent Number: 4,785,768

[45] Date of Patent: Nov. 22, 1988

[54] MEANS AND METHOD FOR CONTROLLING LOAD TURNDOWN IN A FLUIDIZED BED COMBUSTOR

[75] Inventors: Robert C. Brown; William H. Buttermore, both of Ames, Iowa

[73] Assignee: Iowa State University Research Foundation, Inc., Ames, Iowa

[21] Appl. No.: 75,633

[22] Filed: Jul. 20, 1987

Related U.S. Application Data

[63] Continuation-in-part of Ser. No. 907,110, Sep. 15, 1986.

[51] Int. Cl.$^4$ .............................................. B09B 3/00
[52] U.S. Cl. ...................... 122/4 D; 431/7; 431/170; 110/347; 110/245
[58] Field of Search ............... 431/170, 7; 122/4 D; 110/245, 263, 347

[56] References Cited

U.S. PATENT DOCUMENTS

| | | | |
|---|---|---|---|
| 2,121,733 | 6/1938 | Cottrell | 183/6 |
| 2,842,102 | 7/1958 | Blaskowski | 122/4 D |
| 4,249,472 | 2/1981 | Mitchell | 110/245 |
| 4,321,233 | 3/1982 | Tsuji et al. | 422/142 |
| 4,338,283 | 7/1982 | Sakamoto et al. | 431/170 |
| 4,455,969 | 6/1984 | Barker | 122/4 D |
| 4,476,816 | 10/1984 | Cannon et al. | 122/4 D |
| 4,490,157 | 12/1984 | Fernandes | 48/62 R |

FOREIGN PATENT DOCUMENTS 231409 12/1985 Fed. Rep. of Germany ...... 431/170

OTHER PUBLICATIONS

Horio, Hayashi, Morishita, A Novel In-Bed Heat Transfer Tube Capable of Decreasing $h_w$ Linearly with Load Turn-Down" (date unknown), pp. 655-663.

Primary Examiner—Carroll B. Dority, Jr.
Attorney, Agent, or Firm—Zarley McKee, Thomte, Voorhees & Sease

[57] ABSTRACT

A means and method of controlling the load turn-down in a fluidized bed combustor including a fluidized combustion bed having an independent fluidization air source. A separately fluidizable heat transfer bed surrounds the fluidized combustion bed. By independently adjusting the fluidization of the heat transfer bed, the load turn-down of the fluidized bed combustor can be accurately and efficiently controlled.

In an alternative embodiment, one or more heat transfer beds are positioned in and surrounded by the combustion bed. Conduits are then positioned within the heat transfer beds to carry a circulating and heat-conducting medium therethrough.

9 Claims, 2 Drawing Sheets

MEANS AND METHOD FOR CONTROLLING LOAD TURNDOWN IN A FLUIDIZED BED COMBUSTOR

REFERENCE TO RELATED APPLICATION

This application is a continuation-in-part of pending application Ser. No. 907,110, filed Sept. 15, 1986.

BACKGROUND OF THE INVENTION a. Field of the Invention

This invention relates to fluidized bed combustors, and in particular, a means and method for controlling the load turndown ratio in a fluidized bed combustor.

b. Problems in the Art

Combustion of fuel in a fluidized bed is a conventional and well-known process. The advantages of fluidized bed combustion include, but are not limited to, high rate of heat transfer between the hot bed material containing the burning fuel and the wall enclosing the bed, the ability to handle a wide variety of fuel types, and the ability to enact pollution control and treatments.

A significant problem exists, however, with fluidized combustion bed systems. While heat transfer capabilities between the combusting fuel and the wall of the combustion bed are improved by the fluidization material, the ability to control the rate of heat transfer, called the load turndown for the bed, is very limited.

In many cases, the fluidized bed combustor is utilized to produce heat or steam. Depending on the use, it is many times desirable to be able to closely control and vary the combustor output, which is controlled by the heat transfer rate or load turndown. While an obvious method of controlling turndown ratio is to increase or decrease combustion in the fluidized bed, which would produce a corresponding increase or decrease in heat, doing so can have adverse effects on both combustion efficiency and pollution emissions, both of which are primary parameters in most combustion environments.

A variety of methods have been attempted to allow control of load turndown without deleterious effects to combustion efficiency and pollution control. As discussed above, if bed temperature is changed, efficiency is compromised as well as pollution control. Furthermore, temperature change itself is limited by combustion processes themselves.

Another method varies the fluidization air in different sections of the fluidization bed to produce partial bed slumping which in turn reduces active in-bed heat transfer areas. Primary problems with this method are that air leakage to the slumped side causes agglomeration, and splash causes bed material transfer to the slumped side and makes any restarting in that side difficult.

The method of reducing fluidized bed height by reducing the velocity of fluidization air (called "velocity turndown") results in erosion of tubes in the splash zone, and a bed height change is insufficient for large margin turndowns.

Reducing in-bed heat transfer area by actually discharging some of the bed materials also results in erosion of tubes in the splash zone and presents very troublesome particle handling problems.

Independent fluidization or aeration of a separated bed section (called a "wing panel") is insufficient because the heat transfer coefficient is insensitive or too sensitive to such velocity change, and this system is limited to small combustion units.

The prior methods of controlling load turndown in a fluidized bed combustor have many practical difficulties and can provide only partial control of load turndown.

It is therefore a primary object of the present invention to provide a means and method for controlling load turndown in a fluidized bed combustor which improves over or solves the problems and deficiencies in the art.

Another object of the invention is to provide a means and method for controlling load turndown in a fluidized bed combustor which allows a wide variation in load turndown without adverse effects on combustion efficiency and pollution emissions.

A further object of the invention is to provide a means and method for controlling load turndown in a fluidized bed combustor which allows control of the load turndown independent from control of the combustion of the fluidized bed combustor.

Another object of the invention is to provide a means and method for controlling load turndown in a fluidized bed combustor which is simple, efficient, and precisely controllable.

These and other objects, features, and advantages of the invention will become apparent with reference to the accompanying specification and drawings.

SUMMARY OF THE INVENTION

The present invention utilizes a conventional fluidized combustion bed. The fluidized combustion bed is comprised of and bounded by a container which contains the fuel, bed material, and fluidization air which combine during the combustion process. A second container defining a second fluidization bed called a fluidized heat transfer bed, surrounds the container defining the fluidized combustion bed.

The fluidized combustion bed and fluidized heat transfer bed each have independent and separately controlled fluidization air inputs so that different degrees of fluidization can be achieved in each. The exhaust output from the fluidized combustion and heat transfer beds can be either separately outletted, or combined. If combined, this exiting fluidized air can be used as secondary air for combustion.

The load for the fluidized bed combustor can be, but is not limited to, a water jacket which directly surrounds the fluidized heat transfer bed. It is to be understood, however, that other known-in-the-art loads can be used in combination with the present invention.

Load turndown can be precisely controlled over a wide variation by instigating and maintaining combustion in the fluidized combustion bed, as is well known in the art, utilizing the separate fluidization input air to maintain efficient combustion with minimal pollution. By varying the fluidization air level entering the fluidized heat transfer bed from its separate source, the rate of heat transfer from the fluidized combustion bed to the load can be accurately controlled, all without loss in efficiency of combustion or increase in pollution emission.

An alternative embodiment, operating on the same principles, includes positioning one or more heat transfer beds in the combustion bed so that they are surrounded by the combustion bed. Each heat transfer bed would be separated from the combustion bed material by a continuous wall. A heat transfer means such as a conduit for carrying a recirculating and heat-conducting medium, such as water, would then be positioned through each heat transfer bed. The separate and independent fluidization of the heat transfer beds would then, like the previous embodiment, accurately control load turn-down.

DETAILED DESCRIPTION OF THE PREFERRED EMBODIMENT

Figure 1:
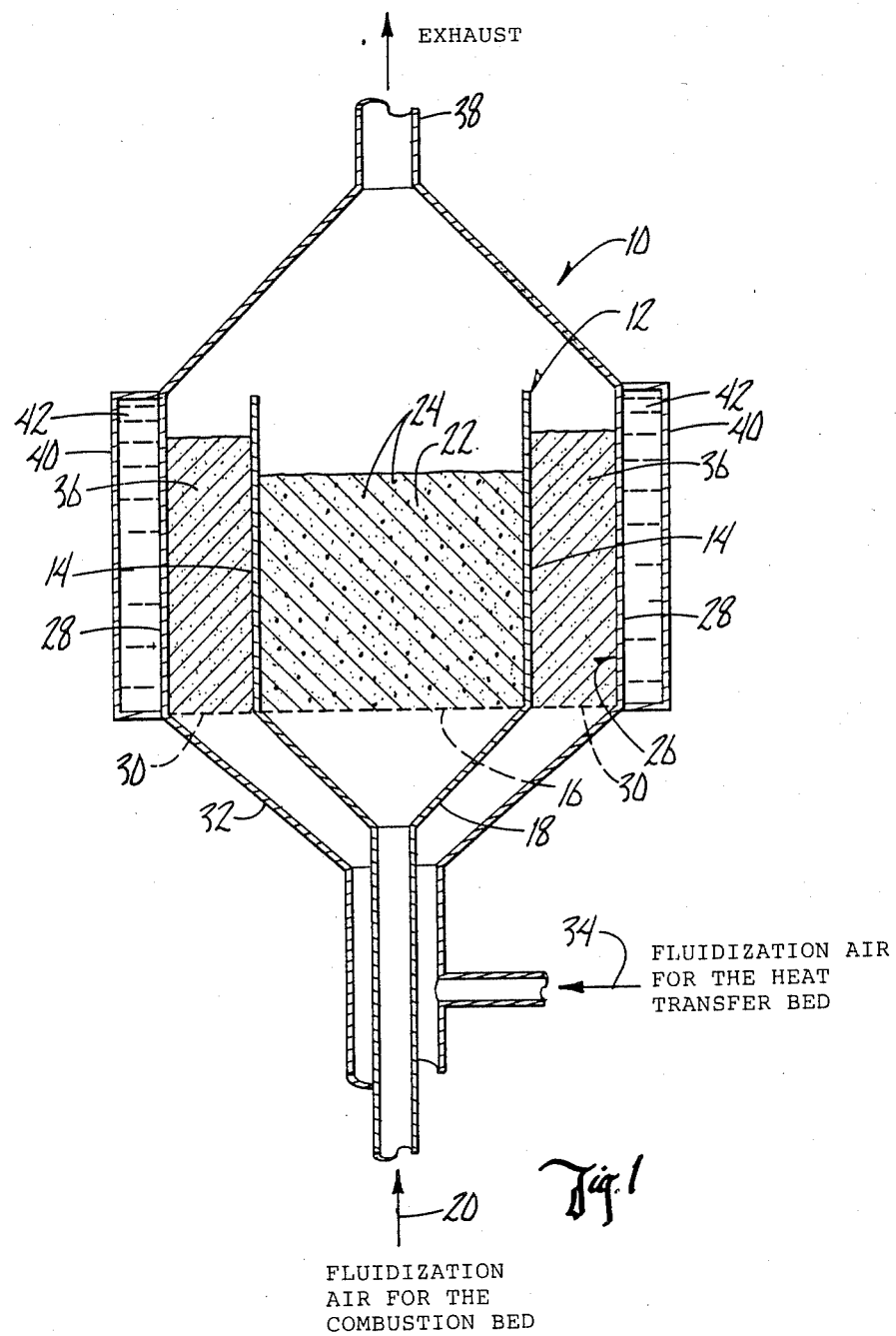
FIG. 1 is a schematic cross-sectional view of one embodiment of the invention.

In reference to FIG. 1 of the drawings, there is shown schematically a fluidized bed combustor 10 according to the invention. A fluidized combustion bed is defined by container 12 having vertical walls 14 and a bottom fluidization air distributor plate 16. Fluidization air is supplied through air plenum 18 which is connected to an independently controllable fluidization air source 20.

The contents of container 12 for the combustion bed are a combination of bed material such as sand or other granular material known in the art (reference numeral 22) and fuel, for example coal (reference numeral 24). Fuel is inputted into container 12 by means conventional and known in the art, and which are not shown in FIG. 1. Container 12 is constructed to retain the bed material 22 and fuel 24 during combustion and over the range of fluidization air pressure levels for the fluidized combustion bed.

In FIG. 1, container 12 is cylindrical in shape. A second annular container 26 surrounds container 12. Annular container 26 has cylindrical vertical walls 28 and an annular air distributor plate 30 which extends between vertical walls 28 and vertical walls 14 of container 12.

A second air plenum 32 channels fluidization air from an independent, separately controllable fluidization air source 34 into annular container 26 which contains only bed material 36 (sand or other granular material).

Both container 12 and annular container 26 open to a common exhaust outlet 38. Air exiting the heat transfer bed serves as secondary air for combustion by mixing it with the combustible gas exiting the combustion bed. After combustion is completed, the gas mixture is removed at exhaust outlet 38.

Directly adjacent to and annularly surrounding vertical walls 28 of annular container 26 is an annular water jacket 40 containing water 42. Water 42 in annular water jacket 40 receives heat from the combustion bed transferred through the heat transfer bed and is transformed into hot water or steam for further use.

Operation of the invention is as follows. Fuel is introduced and ignited in the combustion bed to initiate heat producing combustion. Fluidization air is introduced into the combustion bed through air plenum 18 to fluidize the combustion bed to promote combustion and to enhance heat transfer from the burning fuel to bed material 22 and ultimately to vertical walls 14. This heat transfer is at a high and efficient rate as is known with fluidized bed combustors.

Combustion in the combustion bed is controlled by introduction of fuel and fluidization air to produce the level of combustion desired and the most efficient combustion possible consistent with minimized pollution emissions.

The amount of heat allowed to be transferred to the water jacket is then controlled by the independent control of fluidization air through air plenum 32 to the heat transfer bed.

Overall heat transfer rate to water jacket 40 is determined by the heat transfer coefficients associated with the combustion bed and the heat transfer bed and water jacket 40. In the present invention, only the heat transfer coefficient associated with the heat transfer bed is manipulated to control the overall heat transfer rate, that is, the boiler load. If no air is passed through the heat transfer bed, then the unfluidized bed has the poor heat transfer characteristics of packed granular material. If only sufficient air is passed through the heat transfer bed to minimally fluidize the bed, then increased heat transfer due to convection occurs. Finally, if the heat transfer bed is violently fluidized, enhanced heat transfer characteristic of a bubbling fluidized bed occurs. A continuous and large variation in heat transfer rate can be produced in going from unfluidized to violently fluidized states.

The load turndowns that can be achieved depend on the radial dimension of the heat transfer bed, and the type of material which is used in the heat transfer bed. For a typical one inch radial dimension heat transfer bed, the ratio of maximum to minimum load is ten.

Figure 2:
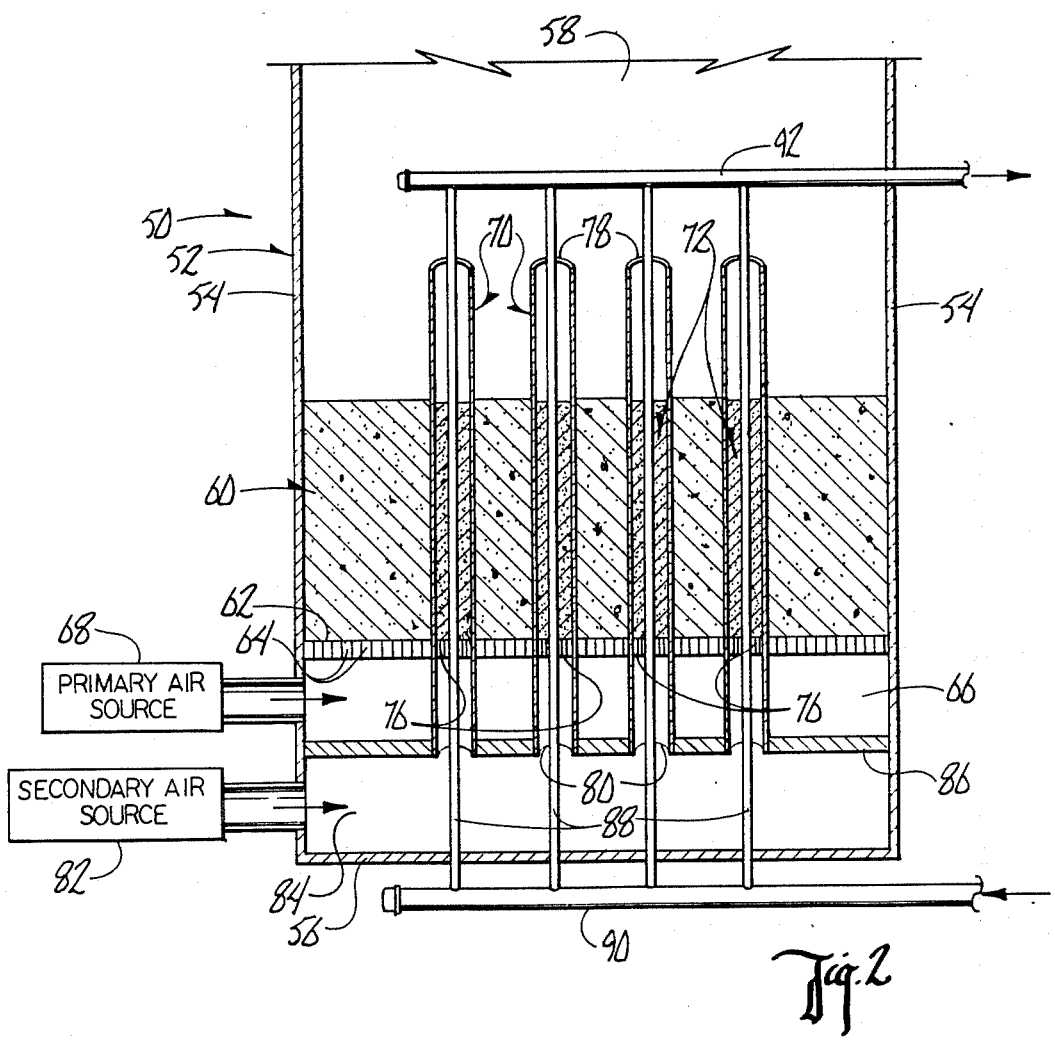
FIG. 2 is a schematic cross-sectional view of an alternative embodiment of the invention.

By referring to FIG. 2, an alternative embodiment of the invention can be described. It is to be understood that the basic operation, functioning and results of this alternative embodiment are generally the same as that described with respect to the first embodiment. The primary difference with respect to the embodiment of FIG. 2 is that one or more heat transfer beds are positioned within the combustion bed rather than having one heat transfer bed surrounding the combustion bed. It is to be further understood that the embodiment of FIG. 2 is better suited for large scale combustors. It allows the removal of heat from within the combustion bed whereas the embodiment of FIG. 1 is limited to heat removal from the perimeter of the bed. In very large combustion beds, heat transfer limited only to the perimeter is not sufficient for temperature control.

Therefore, the embodiment of FIG. 2 includes a large fluidized bed combustor 50 having a container 52 with vertical continuous walls 54 and a bottom wall 56. The upper portion 58 of container 52 comprises an exhaust plenum or free board, such as is known within the art.

The combustion bed 60, containing fuel and combustion bed material such as sand, is defined by vertical continuous walls 54 and distributor plate 62. As with the prior described embodiment, distributor plate 62 includes a plurality of openings 64 which allows combustion bed fluidization air from combustion bed plenum 66 to enter the combustion bed 60, yet it supports the material and fuel in conbustion bed 60. The combustion bed fluidization air is supplied by a separate, independently controlled primary air source 68.

FIG. 2 shows four tubular-in-shape containers 70 which extend vertically and generally parallelly through combustion bed 60. Containers 70 are also generally uniformly spaced out through combustion bed 60.

Each container 70 defines a heat transfer bed 72 by containing heat transfer bed material (such as sand), which is retained by distributor plates 76. Containers 70 have an upper open end 78 and a lower open end 80. Lower open ends 80 extend below distributor plates 62 and 76 and below combustion bed plenum 66 to be in fluid communication with the separate and independently controllable heat transfer bed fluidization air from secondary air source 82 which is distributed by heat transfer bed plenum 84. Heat transfer bed plenum 84 is separated from combustion bed plenum 66 by wall 86.

The upper open end 78 of containers 70 extend above combustion bed 60 and open to upper portion 58 of container 52.

Each heat transfer bed 72 has a water tube 88 extending through it. As seen in FIG. 2, the water is introduced into each water pipe 88 by water input manifold 90 and circulated upwardly through water tubes 88 and withdrawn by water output manifold 92. Water tubes 88 are basically positioned along the longitudinal axes of containers 70 and extend through distributor plate 76.

Operation of the embodiment of FIG. 2 consists of operating the combustion bed 60 in a conventional manner by appropriately controlling primary air source 68 to achieve desired fluidization and combustion. Water is then circulated through water tubes 88. Secondary air source 82 is thus independently controlled to produce the desired fluidization of heat transfer bed 72. The load turn-down ratio is therefore controlled which in turn allows accurate control of heat transfer from the combustion bed to the water carried in the water tubes 88.

It is to be understood that the embodiment of FIG. 2 could be operated with a single heat transfer bed 72 or any number of such beds, according to size of the combustion bed 60 or other factors. The size and shape of containers 52 and 70 can also be modified while staying within the boundaries of the invention.

The included preferred embodiment is given by way of example only, and not by way of limitation to the invention, which is solely described by the claims herein. Variations obvious to one skilled in the art will be included within the invention defined by the claims.

For example, the preferred embodiment of FIG. 1 depicts "fire-tube" boiler construction in which the water is contained in a large pressure vessel. Alternative boiler designs, such as "water-tube" construction in which the water is contained in an array of small diameter tubes, could also be utilized in accordance with the invention.

Many different conventional known in the art methods and apparatus can be used to introduce fuel for combustion into container 12.

Different configurations for air plenums 18 and 32, as well as separate exhaust outlets for each fluidized bed, could be utilized.

Accordingly, different furnace loads can be used, such as are known in the art.

What is claimed is:

1. A method of controlling the load turn-down in a fluidized bed combustor comprising the steps of: combusting fuel in a fluidized combustion bed; positioning and separately fluidizing non-combustible particle material and free combustible material in one or more heat transfer beds positioned within the fluidized combustion bed; positioning and circulating a heat conducting and absorbing medium through each heat transfer bed; and adjusting the fluidization of the heat transfer bed to control the load turn-down.

2. The method of claim 1 wherein the fluidized combustion bed and the fluidized heat transfer beds are fluidized from independent fluidization air sources.

3. The method of claim 1 wherein each heat transfer bed is separated from the combustion bed by a wall.

4. The method of claim 1 wherein the heat conducting and circulating medium is separated from the heat transfer bed by a conduit.

5. A fluidized bed combustor for improving the control of load turn-down comprising:
a first chamber defining a fluidized combustion bed containing fuel and combustion bed material to be fluidized and to contain the combustion process;
one or more second chambers each defining a separately fluidizable heat transfer bed containing non-combustible fluidized particulate material and free of cumbistable material each said second chamber being surrounded at least in part by said first chamber, each said second chamber having a heat conducting means;
so that by controlling the fluidization of each said heat transfer bed separately from the combustion bed, the load turn-down of a fluidized bed combustor can be accurately controlled.

6. The fluidized bed combustor of claim 5 wherein the first chamber comprises a container having at least continuous side walls and a bottom wall to contain and support the bed material and fuel, but having means to allow introduction of combustion bed fluidization air into the interior of the first chamber.

7. The fluidized bed combustor of claim 5 wherein each said second chamber is comprised of a container having at least continuous side walls and a bottom wall to contain and support the bed material but having means to allow introduction of heat transfer bed fluidization air into the interior of the second chamber from a separate fluidization air source.

8. The fluidized bed combustor of claim 5 wherein the combustion bed and the heat transfer beds have independent fluidization air sources.

9. The fluidized bed combustor of claim 5 wherein the heat conducting means comprises a conduit allowing the flow of a recirculating and heat conducting medium.

* * * * *